(12) United States Patent
Matsuo et al.

(10) Patent No.: US 8,190,779 B2
(45) Date of Patent: May 29, 2012

(54) INFORMATION PROCESSING APPARATUS AND STORING APPARATUS, INFORMATION PROCESSING METHOD AND STORING METHOD, AND RECORDING MEDIUM THAT PROMPTLY AND EFFICIENTLY DISTRIBUTES CONTENT

(75) Inventors: Hideki Matsuo, Nagoya (JP); Yoshihiko Hibino, Nagoya (JP); Yuji Kiyohara, Nagoya (JP); Hiroaki Suzuki, Nagoya (JP); Kentaro Ushiyama, Nagoya (JP); Koichi Iijima, Higashikurume (JP); Tomohiro Kudo, Tsukuba (JP); Osamu Tatebe, Ushiku (JP); Yuetsu Kodama, Tsukuba (JP); Kazuyuki Shudo, Kawasaki (JP)

(73) Assignees: Brother Kogyo Kabushiki Kaisha, Nagoya (JP); Xing Inc., Nagoya (JP)

(*) Notice: Subject to any disclaimer, the term of this patent is extended or adjusted under 35 U.S.C. 154(b) by 815 days.

(21) Appl. No.: 11/905,087

(22) Filed: Sep. 27, 2007

(65) Prior Publication Data

US 2008/0027898 A1     Jan. 31, 2008

Related U.S. Application Data

(63) Continuation-in-part of application No. PCT/JP2005/020549, filed on Nov. 9, 2005.

(30) Foreign Application Priority Data

Mar. 29, 2005    (JP) ................................ 2005-095640

(51) Int. Cl.
*G06F 15/16* (2006.01)
(52) U.S. Cl. ........................................ 709/251; 709/250
(58) Field of Classification Search .................. 709/250, 709/251; 707/1
See application file for complete search history.

(56) References Cited

U.S. PATENT DOCUMENTS

| | | | | |
|---|---|---|---|---|
| 2003/0023757 | A1* | 1/2003 | Ishioka et al. | 709/246 |
| 2003/0233281 | A1* | 12/2003 | Takeuchi et al. | 705/26 |
| 2004/0098592 | A1* | 5/2004 | Taki | 713/176 |
| 2004/0107180 | A1* | 6/2004 | Yoshida | 707/1 |
| 2005/0114295 | A1* | 5/2005 | Takashima | 707/1 |
| 2005/0172125 | A1* | 8/2005 | Iwamura | 713/165 |

FOREIGN PATENT DOCUMENTS

JP     A 2002-268979     9/2002

(Continued)

OTHER PUBLICATIONS

Zhao B. et al., "Tapestry: An Infrastructure for Fault-tolerant Wide-area Location and Routing," Apr. 2001, Technical Report UCB/CSD-01-1141, Sections 2, 3 & 4, pp. 1-27.

(Continued)

*Primary Examiner* — Djenane Bayard
*Assistant Examiner* — Umar Cheema
(74) *Attorney, Agent, or Firm* — Oliff & Berridge, PLC

(57) ABSTRACT

The present invention provides a distribution system in which even in the case where the content distributability varies among content holders, desired content can be promptly and efficiently received by a requester.

To index information recorded in a root node or cache node so that it can be referred to from the requester, in addition to content ID and IP address of a content holder, easiness information indicative of easiness of distribution of content from the content holder are added. When the requester determines a content holder as a distribution source, a content holder having high distributability is preferentially selected with reference to the easiness information and content is distributed from the selected content holder.

29 Claims, 10 Drawing Sheets

FOREIGN PATENT DOCUMENTS

JP    A 2004-185263    7/2004

OTHER PUBLICATIONS

Shimotsuma Y. et al., A Qos Control Method of P2P Content-Delivery Network, Mar. 2002, Proceedings of the 2002 IEICE General Conference, p. 164.

Stoica I. et al., "Chord: A Scalable Peer-to-Peer Lookup Service for Internet Applications," ACM Sigcomm, Aug. 2001, Sections 4 & 5, pp. 1-12.

Office Action mailed Apr. 20, 2010 for Japanese Application No. 2005-095640 (with partial translation).

* cited by examiner

| CONTENT ID | IP ADDRESS OF CONTENT HOLDER | TITLE | GENRE | DIRECTOR'S NAME | ACTOR | |
|---|---|---|---|---|---|---|
| 54DE9878 | 221:23:154:65 | TANIC | LOVE ROMANCE | JAMES MELLON | NALD DICAPLI | ⎫ |
| 1024D67D0 | 131:31:75:100 | PIDERMAN | SF ADVENTURE | SAM RAI | TOBBY GUWAI | ⎬ EX |
| 0034D0985 | 62:163:15:165 | TRICK | SF FANTASY | RALLY WOSHAW | ANNE LEAVE | ⎭ |

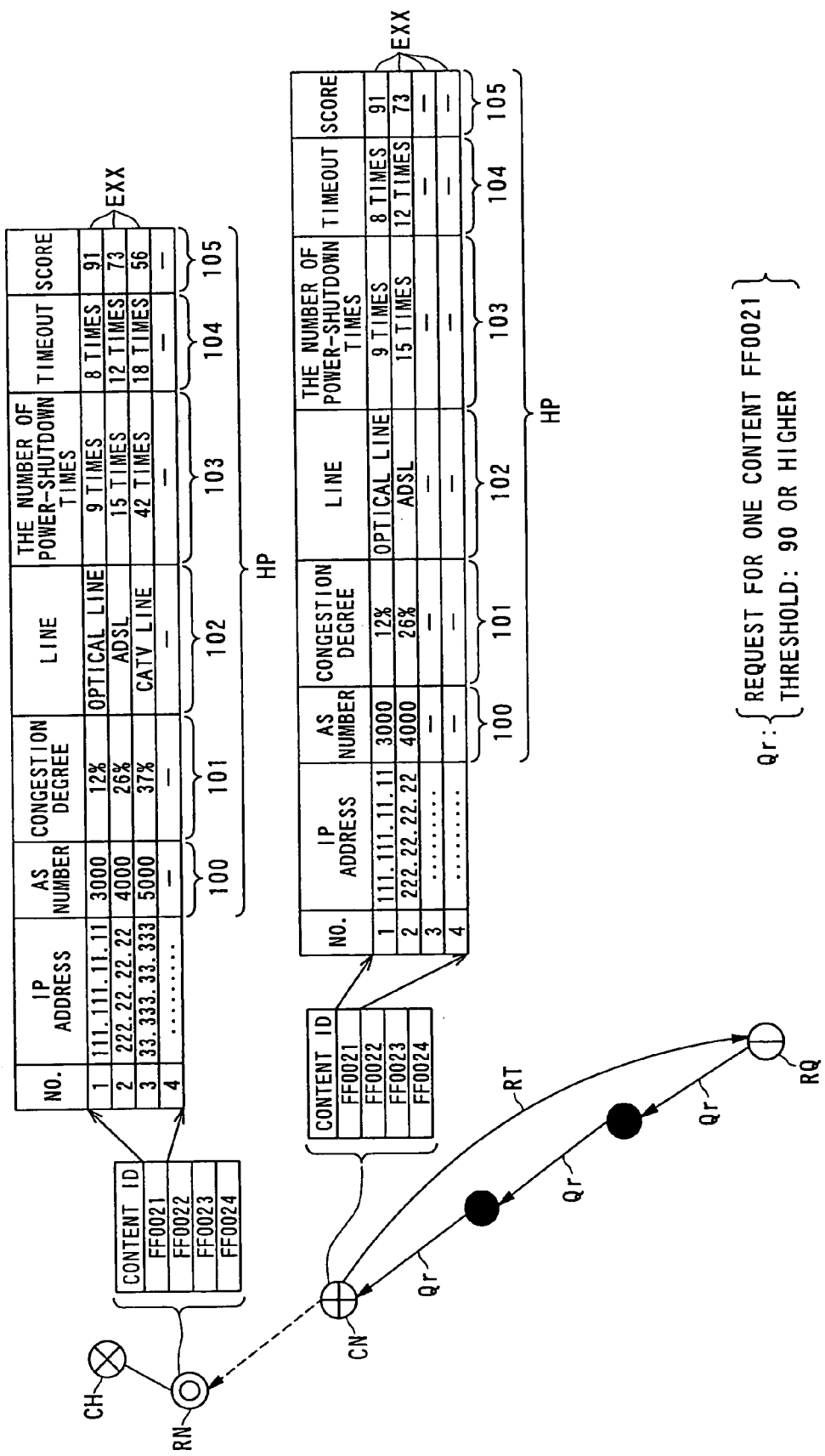

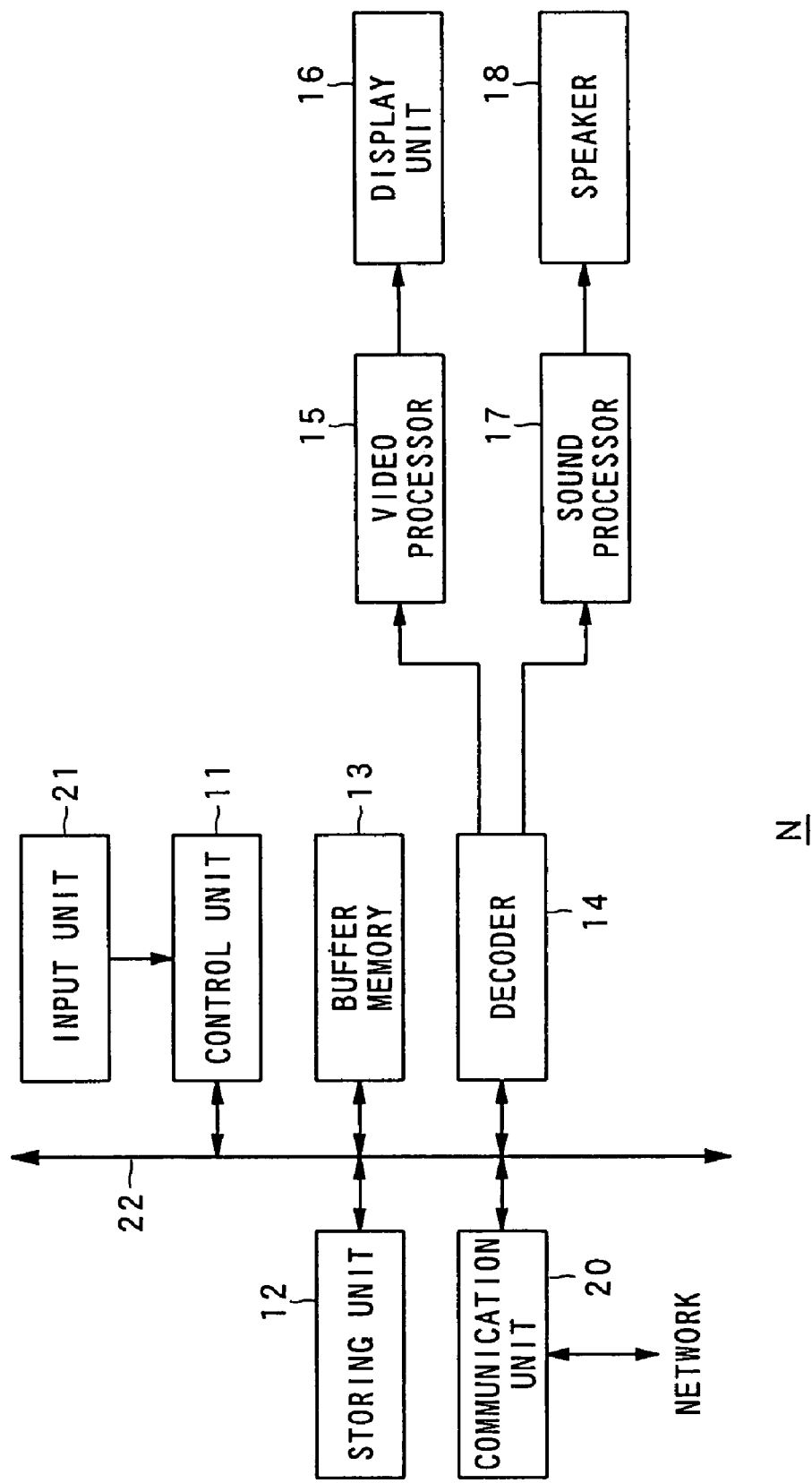

FIG. 6A

| KIND OF LINE | THE NUMBER OF STREAMS WHICH CAN BE SUPPLIED (SCORE) |
|---|---|
| OPTICAL LINE | 15 |
| ADSL | 6 |
| CATV LINE | 9 |

| CONGESTION DEGREE | SCORE |
|---|---|
| 0~10% | 50 |
| 11~20% | 45 |
| 21~30% | 40 |
| 31~40% | 35 |
| 41~50% | 30 |
| 51~60% | 25 |
| 61~70% | 20 |
| 71~80% | 15 |
| 81~90% | 10 |
| 91~100% | 5 |

| THE NUMBER OF POWER-SHUTDOWN TIMES | SCORE |
|---|---|
| 10 OR LESS | 10 |
| 11 TO 30 | 7 |
| 31 TO 50 | 4 |
| 50 OR MORE | 1 |

| THE NUMBER OF TIMEOUTS | SCORE |
|---|---|
| 20 OR LESS | 10 |
| 21 TO 50 | 7 |
| 51 TO 100 | 4 |
| 100 OR MORE | 1 |

~104

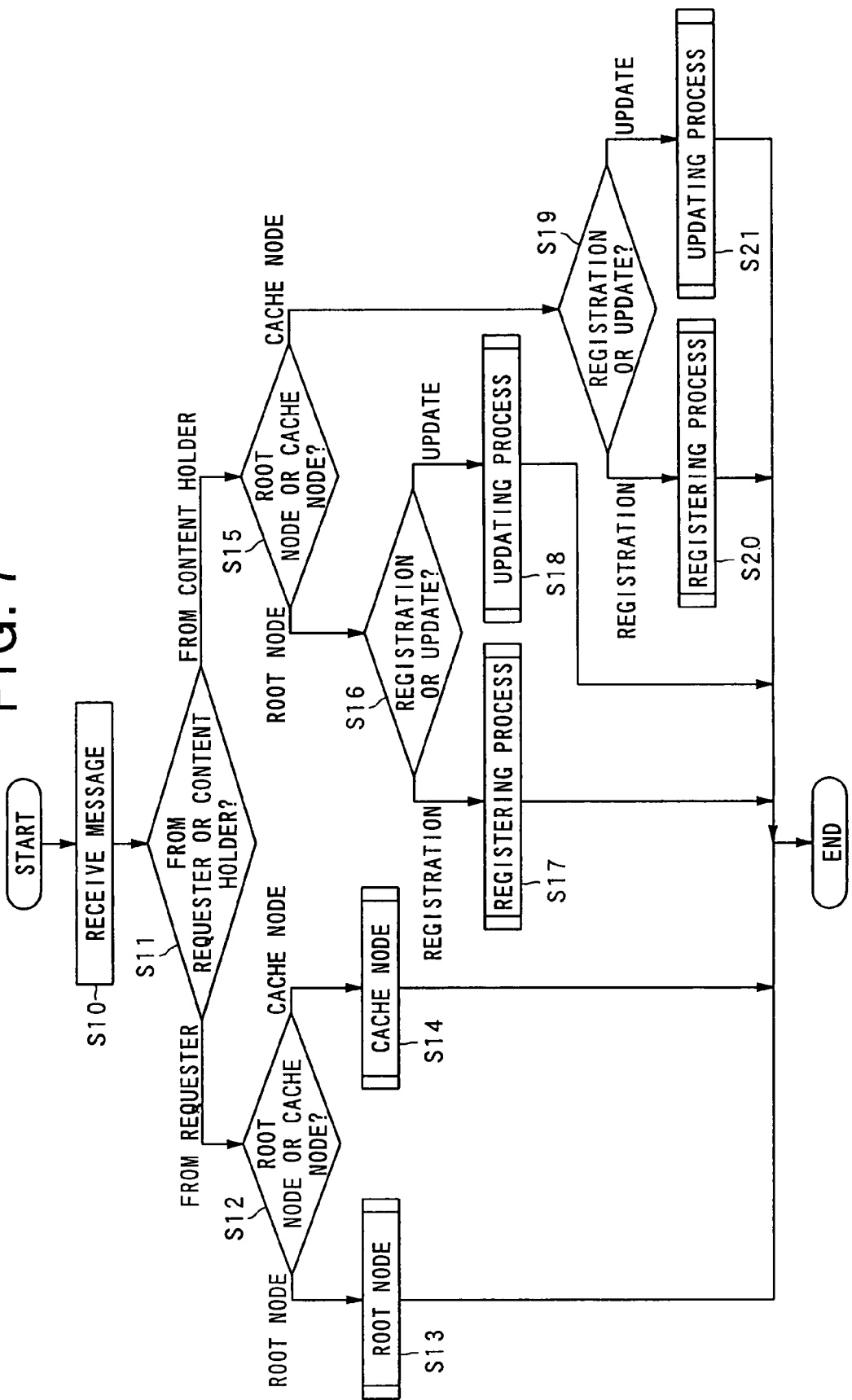

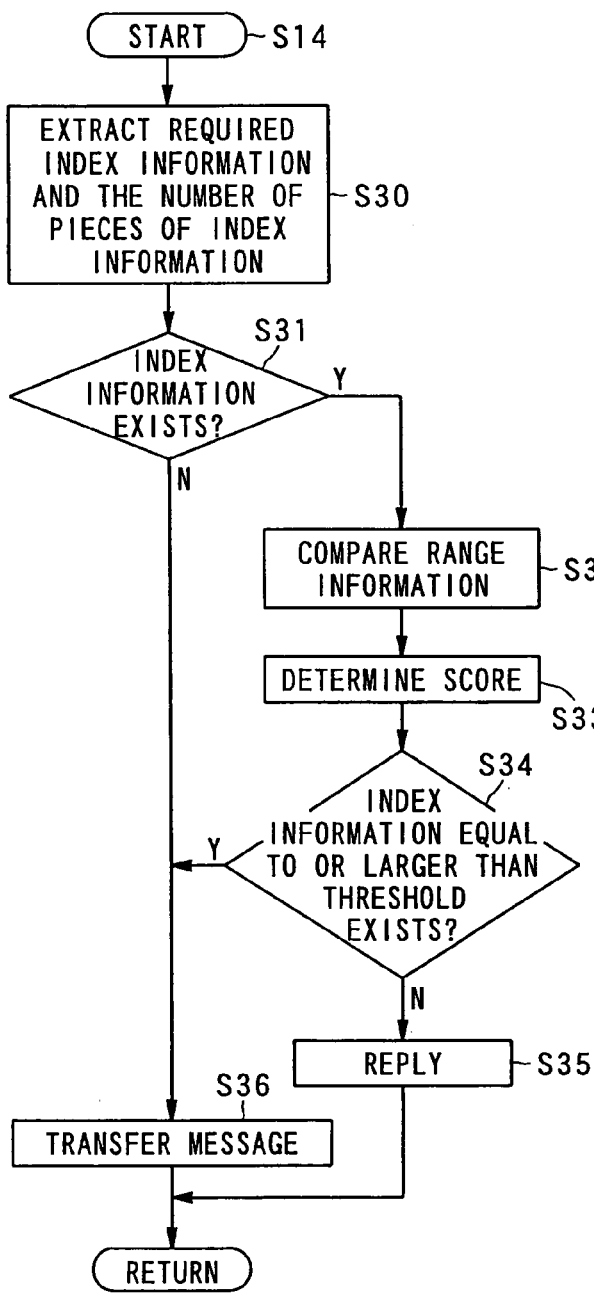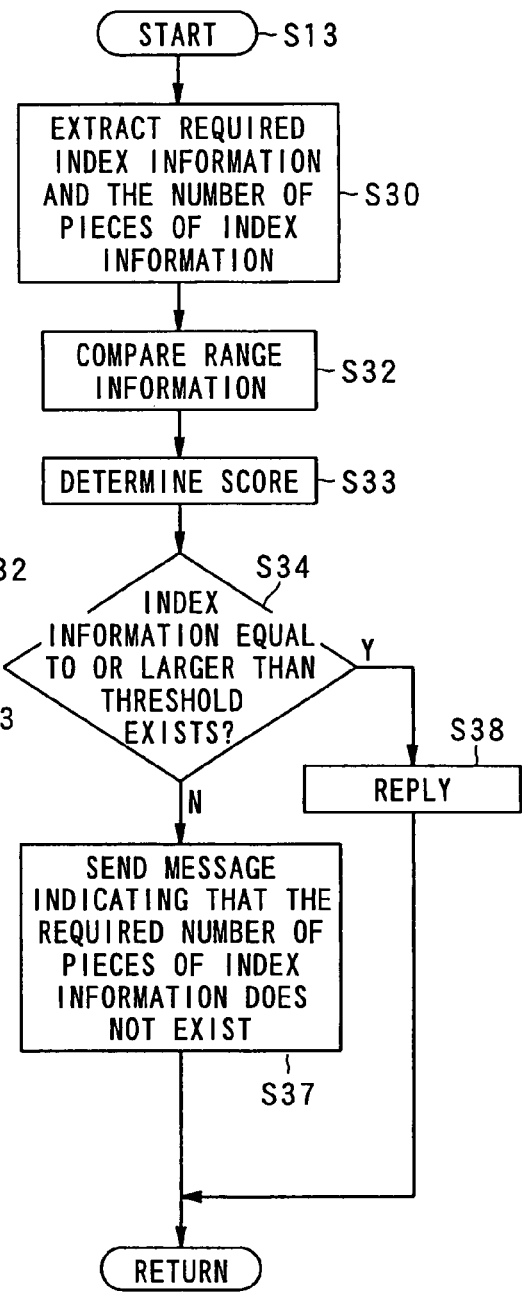

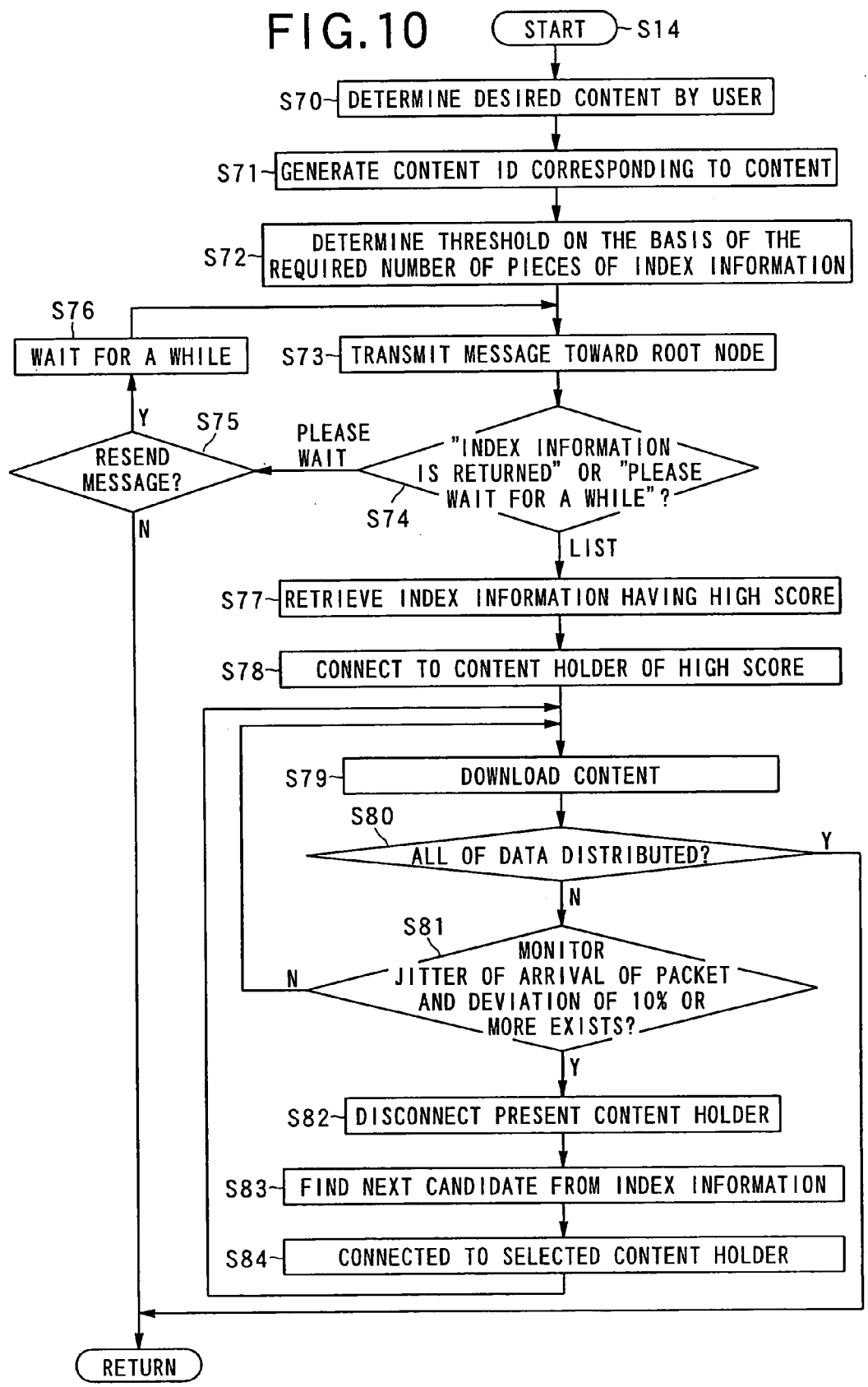

INFORMATION PROCESSING APPARATUS AND STORING APPARATUS, INFORMATION PROCESSING METHOD AND STORING METHOD, AND RECORDING MEDIUM THAT PROMPTLY AND EFFICIENTLY DISTRIBUTES CONTENT

CROSS REFERENCE TO RELATED APPLICATION

The present application claims priority from Japanese Patent Application No. 2005-095640, which was filed on Mar. 29, 2005, the disclosure of which is herein incorporated by reference in its entirety.

BACKGROUND OF THE INVENTION

1. Field of the Invention

The present invention belongs to the technical field of an information processing apparatus and a storing apparatus, an information processing method and a storing method, and a recording medium. More particularly, the invention belongs to the technical field of a storing apparatus for storing, as content for distribution, content (distribution information) such as a movie to be distributed via a network, an information processing apparatus for distributing the distribution information from the storing apparatus, a storing method and an information processing method in the storing apparatus and the information processing apparatus, and a recording medium where a program for the storing apparatus is recorded so as to be readable by a computer, and a recording medium where a program for the information processing apparatus is recorded so as to be readable by a computer.

2. Discussion of the Related Art

In recent years, so-called content distribution is being actively studied and developed. The content distribution is performed by accessing a server or the like storing the content from a terminal device via a network such as the Internet, and distributing content desired to be viewed in the terminal device to the terminal device so that the user can view the content.

A basic configuration of a conventional distribution system for distributing content is that, for example, as disclosed in Japanese Unexamined Patent Application Publication No. 2004-185263, a terminal device desiring content distribution is connected to a server or the like which stores the content via the network. After the connection is established, the desired content is distributed, that is, the terminal device receives the distributed content.

In the conventional distribution system, a terminal device to receive content desired to be distributed does not know a distribution state at that time of a server or the like that stores the content (that is, a state in which the server or the like operates stably or content distribution requests are sent also from other terminal devices and content distribution is congested).

SUMMARY OF THE INVENTION

The conventional distribution system has a problem. For example, at the time of connection to a server or the like which is simply closest on a network to receive content, in the case where the operation of the server or the like is unstable or congestion occurs in relation to other terminal devices, although connection is established, it may take very long time to obtain the content (in the case where congestion occurs in the server or the like) or distribution may be forcedly finished (the operation of the server or the like may stop).

When reception of content fails for any of the above-described reasons after connection is established, it is necessary to perform a process of newly retrieving a server or the like storing the same content and establishing connection again to the server or the like on a network. There is a problem such that it takes time to obtain desired content.

The present invention has been achieved in view of the problems. An object of the invention is to provide a storing apparatus for storing desired content so that the content can be received promptly and efficiently by a terminal device even in the case where the content distributability varies among servers, an information processing apparatus for distributing the content from the storing apparatus, a storing method and an information processing method in the storing apparatus and the information processing apparatus, and a recording medium where a program for the storing apparatus is recorded so as to be readable by a computer, and a recording medium where a program for the information processing apparatus is recorded so as to be readable by a computer.

In order to the above problems, the invention according to claim 1 relates to an information processing apparatus comprising:

first obtaining means for obtaining storing apparatus information including distribution information identification information for identifying distribution information to be distributed and storing apparatus identification information for identifying a storing apparatus for storing the distribution information to be distributed;

second obtaining means for obtaining distributability information including easiness information indicative of easiness of distribution of the distribution information identified by the distribution information identification information from the storing apparatus identified by the storing apparatus identification information and the storing apparatus identification information indicative of the storing apparatus that stores the distribution information having easiness of distribution indicated by the easiness information; and recording means for recording the obtained storing apparatus information and the obtained distributability information so that it can be referred to from another information processing apparatus via a network.

BRIEF DESCRIPTION OF DRAWINGS

FIG. 1A is a schematic view showing an ID space in the distribution system, and FIG. 1B is a diagram showing index information.

FIG. 2A is a schematic diagram showing a transmission state of a message in the distribution system, and FIG. 2B is a diagram showing a transmission state of the message expressed as a spanning tree.

FIG. 3 is a diagram showing the principle of the present invention.

FIG. 4 is a block diagram showing main components of a node according to the embodiment, which are common to content holders and the like.

FIGS. 6A to 6D are diagrams illustrating concrete examples of parameters of distributability of the embodiment. FIG. 6A is a diagram showing a concrete example of line kind information in the embodiment, FIG. 6B is a diagram showing a concrete example of congestion degree information of the embodiment, and FIGS. 6C and 6D are diagrams each showing a concrete example of frequency information in the embodiment.

FIG. 7 is a flowchart showing a general operation in a root node and a cache node in the embodiment.

FIGS. 8A and 8B are flowcharts (I) showing detailed operations in the root node and the cache node in the embodiment. FIG. 8A is a flowchart showing an operation corresponding to a distribution source query message in the cache node, and FIG. 8B is a flowchart showing operation corresponding to the distribution source query message in the root node.

FIGS. 9A and 9B are flowcharts showing an operation corresponding to a registration message in the root node, and FIGS. 9C and 9D are flowcharts showing an operation corresponding to the registration message in the cache node.

FIG. 10 is a flowchart showing an operation in a requester in the embodiment.

DETAILED DESCRIPTION OF THE PREFERRED EMBODIMENTS

Figures 1A, 1B:
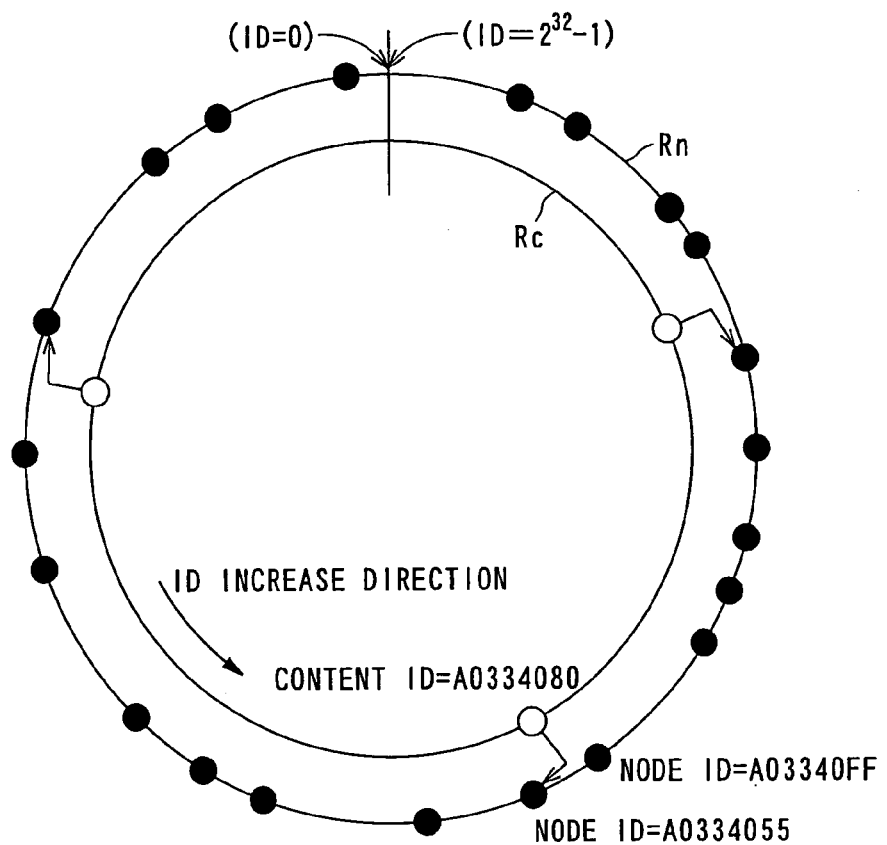
FIGS. 1A and 1B are schematic diagrams (I) showing an outline of a distribution system according to an embodiment.

Best modes for carrying out the present invention will now be described with reference to the drawings. The following embodiments relate to a distribution system for distributing the content by using a network such as the Internet, which is a distribution system in which the content is directly transmitted/received among terminal devices belonging to the network (in other words, content is shared by a plurality of terminal devices), that is, a so-called P2P (Peer to Peer) distribution system. In the following description, the terminal device will be generally called a "node".

(I) Principle of the Present Invention

First, prior to concrete description of embodiments of the invention, the principle of the present invention will be described together with outline of a P2P distribution system (hereinbelow, simply called distribution system) of the embodiments.

(A) Outline of Distribution System

First, outline of the distribution according to the embodiment will be described with reference to FIGS. 1A and 1B and FIGS. 2A and 2B. FIGS. 1A and 1B and FIGS. 2A and 2B are schematic diagrams showing the outline of the distribution system.

Generally, when a specific node connected to the network obtains content stored in another node from the another node, the specific node has to know information of content stored in each of nodes. For example, when the network is the Internet, a set of index information (such as the title of a movie) by which content can be specified and the IP (Internet Protocol) address of a node storing the information is recognized and, using the IP address as a key, desired content has to be transmitted/received. Therefore, in a distribution system in which an indefinite number of nodes share content such as the distribution system of the embodiment, each of the nodes has to preliminarily recognize index information of all of content pieces and the IP addresses of nodes storing the information.

However, in the case where the number of nodes connected to the network increases, for reasons such as limitation in a physical recordable amount in each node, it is not realistic to record index information of all of content pieces and the IP addresses of nodes storing the content pieces in each of nodes (for example, in the case where one million nodes are connected to a network, it is not realistic to record the IP addresses of the one million nodes).

In the case where each of nodes records indexes of all of content pieces and the IP addresses of nodes storing the content pieces, also when the power switch in any of the nodes is frequently turned on and off (for example, in the case where the node is realized by a personal computer, the power switch is frequently operated), the IP addresses and the like recorded in the node are frequently updated. In practice, it is difficult to carry out the operation of the network as a whole.

To solve the problem, distribution systems are being studied having a construction such that only the IP addresses of the minimum nodes are recorded and content to be distributed to a node which does not recognize the IP addresses is transferred via another node to the node. One of the distribution systems uses a so-called DHT (Distributed Hash Table).

Outline of the distribution system using the DHT will now be described.

In the distribution system using the DHT, the node ID (Identification) for identifying a node is assigned to each of the nodes. As the node ID, unique number, that is, number different from those of the other nodes are assigned to each of the nodes. The number has the number of bits (bit length) large (long) enough to accommodate the maximum use number of nodes in the network. More concretely, for example, when a node ID of 128 bits is used, $2^{128}$ ($=340\times10^{36}$) nodes can be connected to one network at the maximum. Generally, as the node ID, a value obtained by applying hash function to a value peculiar to each node such as the IP address assigned to the node itself, a so-called MAC (Media Access Control) address, serial number of the node itself, or the like is used.

Next, in the distribution system using the DHT, a unique content ID different from those of the other content is assigned also to content itself to be distributed by the distribution system. The bit length of the content ID is the same as that of the node ID. As the content ID, generally, a value obtained by applying hash function to title data indicative of the title of the content, attribute data indicative of the attribute of data of the content, data of a few bytes from the head, or the like is used.

In relation to the fact that corresponding node ID and content ID are expressed in the same bit length, it can be also considered that the nodes and content pieces are dotted in the same ring-shaped virtual ID space. To be specific, as shown in FIG. 1A in which nodes are displayed in solid circles and content pieces are displayed in blank circles, when it is assumed that a ring Rc to which the content pieces belong and a ring Rn to which the nodes belong are virtually concentrically provided and it is specified that the value of the IDs increase counterclockwisely in the rings Rc and Rn, it can be assumed that the nodes and the content pieces exist on the rings Rc and Rn without overlapping each other. When each ID is expressed in 128 bits as in the above example, the number of digits is too large. In FIG. 1A, for simplicity of description, the bit length of each ID is expressed as 32 bits (similarly expressed in the following). Since the hash function is used at the time of determining the value of each ID, the nodes and content pieces exist so as to be uniformly dispersed on the rings Rc and Rn without being biased.

On the other hand, in the distribution system using the DHT, "a node managing content to which a certain content ID is assigned is a node to which a node ID having a value closest to the value of the content ID is assigned".

The term "close" may have any definition as long as it is consistent in various specifications regarding the distribution system. Concretely, it is defined as, for example, "a value not exceeding the value of the content ID and having the smallest difference from the value of the content ID".

Concretely, for example, as shown in FIG. 1A, when a node having a node ID whose value is "A0334055" and a node having a node ID whose value is "A03340FF" exist so as to be neighboring each other on the ring Rn, content having a content ID whose value is "A0334080" is managed by the node having the node ID whose value is "A0334055". In FIG. 1A, information of terminals managing the content of the blank circles is indicated by the arrows extended from the blank circles. In this manner, various content pieces can be managed so as to be spread to a number of nodes.

In this case, "manage" does not mean that content to which the content ID is assigned is recorded but means that the location (for example, the IP address or the like) of the node recording the content is recognized. In practice, a node recording content and a node managing the content may be different from each other, or content to be managed may be recorded in a node to manage the content.

A node for managing content will be called a "root node". In the root node, index information made of a pair of the content ID of the content managed by the root node and the IP address of a node recording content indicated by the content ID is recorded so that the index information can be referred to from another node in the distribution system. In some cases, the index information includes the title, the attribute (genre), and the like of the content.

When content IDs of different content pieces have values close to each other by chance and there is only one root node having a node ID whose value is close to the values of the content IDs, the one root node records a plurality of pieces of index information corresponding to a plurality of content pieces. Further, in the case where the same content is recorded in a plurality of different nodes and the nodes recording the same content are close to one root node by chance, the index information of the plurality of nodes recording the same content is recorded in the root node. FIG. 1B shows an example of the index information EX in the root node.

Further, a node actually recording content itself will be called a "content holder". Since the content holder itself is a node, the node ID of the node exists on the ring Rn in FIG. 1A.

A DHT (routing table) as one of devices to eliminate necessity of recording the IP addresses of all of nodes in each of the nodes in the distribution system using the DHT will now be described.

In the DHT of the embodiment, the ID space shown in FIG. 1A is divided level by level in stepwise manner while increasing the number of levels (for example, in the case of level 1, the ID space is divided into four areas). In each of the levels (in each of the areas divided step by step), routing information made by a pair of the node ID and the IP address of an arbitrary node is described. For example, in the case of transferring distribution source query information for requesting content distribution source information to the root node in which the index information is recorded, the inquiry information is transferred to a target root node with reference to the routing information. That is, each time the level in the DHT becomes higher, one digit in the node ID to be routed matches that in the node ID of the root node as a destination and, finally, the request information matches the root node as the destination.

In the distribution system using the DHT, the query information, distribution request information requesting distribution itself of the content, a registration message which will be described later, and the like are called "messages". When the DHT having the structure is used, the message can be efficiently transferred to a target node in the ID space illustrated in FIG. 1A. In the following description, when new content is recorded inn a content holder, to make the content found from other nodes (to make the content open), a message generated in the content holder will be called a registration message, and a message transmitted from a requester which will be described later to a root node or a cache node which will be described later will be called a distribution source query message.

Since the value of the node ID of the root node is the closest to the value of the node ID of the content holder whose content is managed by the root node, the distribution source query message reaches the root node that manages the content requested to be distributed just before it reaches the content holder requested by the distribution query message. The root node which receives the distribution source query message returns the IP address or the like of the content holder storing the content requested by the distribution source query message to the sender of the distribution source query message. Specifically, from the index information (refer to FIG. 1B) recorded in the root node, the title indicative of content requested by the distribution source query message, attribute information, the IP address of the node as the content holder, and the like are sent back to a node as the sender of the distribution query message. By utilizing such a DHT, the location of desired content can be recognized efficiently in, for example, a distribution request source. The content distribution request source will be called a "requester" hereinbelow.

Next, the process of registering content in the case where new content is stored in a node will be described.

When new content is stored in a node, that is, a content holder of the content, the content holder opens that the content is stored in another node in the distribution system.

That is, when new content is stored in a node, anode serving as a content holder of the stored content calculates a content ID corresponding to the content on the basis of the title or the like of the stored content.

Next, the content holder transmits a registration message to a node having a node ID whose value is the same as that of the calculated content ID, as a destination (irrespective of whether a node having the node ID exists or not). The registration message includes the title indicative of the content, the attribute information, the IP address of the node as the content holder, and the like. The registration message is sequentially transferred to the nodes as destinations at levels by routing in accordance with the description of above DHT.

When the registration message reaches a node having the node ID of the closest value, it is recognized that the node to which the registration message is to be transferred does not exist in the ID space (when the digits are matched in the DHT, it is recognizing that the node to which the message is to be transferred next is the node itself). The node to which the registration message has arrived at this time point becomes the root node that manages new content. The node which becomes the root node records, as the index information EX illustrated in FIG. 1B, content ID included in the registration message, the IP address indicative of the content holder, attribute information, and the like.

Figure 2A:
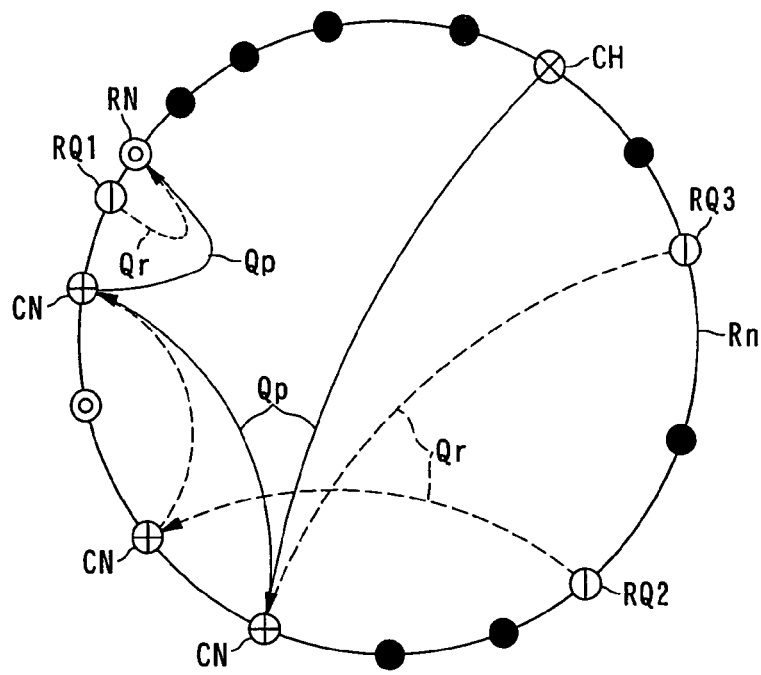
FIGS. 2A and 2B are schematic diagrams (II) showing an outline of a distribution system according to the embodiment.
Figure 2B:
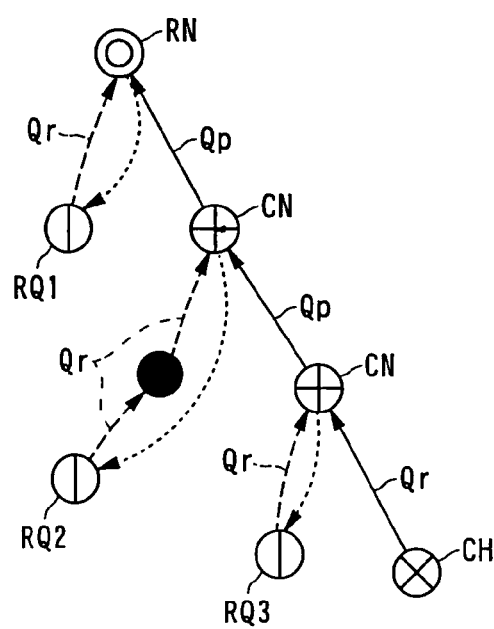

The concept of a "cache node" in the distribution system of the embodiment will now be described with reference to FIGS. 2A and 2B. In FIGS. 2A and 2B and FIG. 3 to be described later, a root node is expressed by a double circle, a content holder is expressed by a circle having therein an X, a requester is expressed by a circle having therein a vertical line, a cache node which will be described later is expressed by a circuit having therein +, and the other general nodes are expressed by solid circles.

In the case of transferring distribution source query messages Qr from requesters RQ1 to RQ3 to a root node RN (or content holder CH) by the routing using the DHT, the transfer paths (indicated by broken lines in FIGS. 2A and 2B) are similar to paths (indicated by continuous lines in FIGS. 2A and 2B) of the registration message Qp as shown in FIG. 2A. Consequently, by recording the index information EX illustrated in FIG. 1B also in each of the nodes (expressed by reference characters CN in FIG. 2A) on the paths, a reply to the distribution source query message Qr can be returned to the requesters RQ1 to RQ3 at an early stage in correspondence with the distribution source query message Qr sent via the paths before the distribution source query message Qr reaches the root node RN or content holder CH as the destination.

That is, when the requesters RQ1 to RQ3 requesting distribution of content which is made open in the distribution system transmit the distribution source query message Qr requesting the IP address of a node (that is, content holder CH) in which the content is recorded, the distribution source query message Qr is transferred to a routing destination described in the DHT in each of the nodes and approaches the root node RN. Finally, the path merges with the path of the registration message Qp from the content holder CH and reaches the root node RN.

When the path on the ring Rc shown in FIG. 2A is replaced with a tree structure, a-tree structure as shown in FIG. 2B is obtained. In the embodiment, the structure will be called a "spanning tree".

As shown in FIG. 2A, the path of the distribution source query message Qr transmitted from any of the requesters RQ and that of the registration message Qp transmitted from the content holder CH cross each other in any of nodes on the paths. The registration message Qp is transferred while temporarily recording the index information EX included in the registration message Qp in a temporary recordable area in each of the nodes on the path for transferring the registration message Qp to be open to the root node RN. In this manner, a reply for the distribution source query message Qr from the requester RQ can be sent from a node to which the distribution source query message Qr has reached on the path to the root node RN before the distribution source query message Qr reaches the root node RN. The node other than the root node RN and temporarily recording the index information EX will be called a "cache node" CN hereinbelow.

(B) Principle of the Invention

Next, the principle of the present invention employing, as a precondition, the distribution system whose outline has been stated above will be described with reference to FIG. 3.

The index information EX in the distribution system is as shown in FIG. 1B. The index information EX includes, other than the information indicative of the content itself (for example, the title, genre, director's name, and the like shown in FIG. 1B) to which the index information EX corresponds, only the corresponding content ID, the IP address of the content holder CH as a storing device in which the content is recorded, and the like. The index information EX does not include information of content distributability in the corresponding content holder CH itself.

Consequently, as shown in FIG. 3, in the present invention, distributability information HP indicative of distributability of content from the content holder CH in which the content corresponding to the index information EX is recorded is added to the index information EX. When the requester RQ as another information processing apparatus refers to the index information EX with the distributability HP and connects itself to the content holder CH having the highest distributability so that the content is distributed from the content holder CH. In the following embodiment, the index information of the invention to which the distributability information HP is added will be called index information EXX. In FIG. 3, the index information EXX corresponding to a plurality of pieces of content is recorded in the root node RN as an information processing apparatus. Further, for one piece of content, the index information EXX showing a plurality of content holders CH in which the same content is recorded is recorded.

Parameters included in the distributability information HP are, concretely, range information 100, congestion degree information 101, line kind information 102, frequency information 103, frequency information 104, and score information 105. The range information 100 expresses the range on a network on which the content holder CH that records the content requested to be distributed from the requester RQ exists. The congestion degree information 101 indicates the congestion degree in the content holder CH (that is, the number of other nodes connected to the content holder CH at present). The line kind information 102 indicates the kind of a transmission line used for distributing content from the content holder CH (in other words, the maximum transmission speed of the transmission line). The frequency information 103 shows the frequency of occurrence of interruption of power supply to the content holder CH. The frequency information 104 shows the frequency that a process for distributing content in the content holder CH is stopped (that is, occurrence of so-called timeout in the content holder CH). The score information 105 shows total score of a value obtained by scoring the range information 100, the congestion degree information 101, the line kind information 102, and the frequency information 103 and 104 by a method to be described later.

Further, the index information EXX similar to the above is recorded not only in the root node RN shown in FIG. 3 but also the cache node CN as the information processing apparatus. By referring to the index information EXX, without sending the distribution source query message Qr as request information from the requester RQ to the root node RN, reply information RT corresponding to the distribution source query message Qr can be sent to the requester RQ.

In the case of the distribution system according to the present invention in which the same content is recorded in the plurality of content holders CH, the distribution source query message Qr includes content ID of content desired to be distributed and, in addition, information indicative of the number of pieces of the index information EXX corresponding to the content holder CH that records the content and desired to be referred to from the requester RQ. The requester RQ which has sent the distribution source query message Qr selects the content holder CH having the highest content distributability in the plurality of pieces of index information EXX referred to, connects itself to the content holder CH, and receives the content distributed.

As described above, by recording the index information EXX including the distributability information HP according to the invention in the root node RN and the cache node CN, desired content can be distributed promptly and easily from the content holder CH having high distributability.

(II) Embodiments

Embodiments according to the invention according to the above-described principle will now be described with reference to FIGS. 4 to 10.

First, a schematic configuration of a node in the embodiment will be described with reference to FIG. 4. FIG. 4 is a block diagram showing a schematic configuration of the node in the embodiment. In the embodiment, the content holder CH, the requester RQ, the root node RN, the cache node CN, and the other nodes have basically the same hardware configuration. The outline of the configuration of a general node N as a representative of the nodes will be described with reference to FIG. 4.

As shown in FIG. 4, a node N included in the distribution system according to the embodiment has: a control unit 11 including a CPU having an operating function, a RAM (Random Access Memory) for work, and a ROM (Read Only Memory) for recording various data and programs; a recording unit 12 such as an HDD for recording and storing content data as the content itself, the index information EXX, the DHT, other necessary programs, and the like (the content data is recorded only in the recording unit 12 in the node N as the content holder CH before it is distributed); a buffer memory 13 for temporarily storing received content data; a decoder 14 for decoding (expanding, deciphering, or the like) encoded video data (video information), audio data (sound information), and the like included in the content data; a video processor 15 for performing a predetermined rendering process on the decoded video data and the like and outputting the resultant data as a video signal; a display unit 16 constructed by a CRT (Cathode Ray Tube), a liquid crystal display, or the like for displaying an image on the basis of the video signal output from the video processor 15; a sound processor 17 for D/A (Digital/Analog) converting the decoded audio data to an analog audio signal, amplifying the analog audio signal by an amplifier or the like, and outputting the amplified audio signal; a speaker 18 for outputting the audio signal output from the sound processor 17 as sound waves; a communication unit 20 for performing communication control on information between the communication unit 20 and another node device 1 via a network 8; and an input unit (for example, a keyboard, a mouse, an operation panel, and the like) 21 for receiving an instruction of the user and outputting an instruction signal according to the instruction to the control unit 11. The control unit 11, recording unit 12, buffer memory 13, decoder 14, and communication unit 20 are connected to each other so that data can be transmitted among them via a bus 22.

By executing various programs recorded in the recording unit 12 and the like by the CPU in the control unit 11, the control unit 11 controls the general operations of the requester RQ, cache node CN, root node RN, content holder CH, and the other general nodes N in a centralized manner.

In the case where the node N is the content holder CH as a storing apparatus according to the present invention, the control unit 11 functions as first generating means, second generating means, and scoring means of the invention, and the communication unit 20 functions as transmitting means of the invention. In the case where the node N is the root node RN or cache node CN as an information processing apparatus according to the present invention, the control unit 11 functions as first obtaining means, second obtaining means, updating means, scoring means, and retrieving means, the recording unit 12 functions as recording means, and the communication unit 20 functions as transmitting means. Further, in the case where the node N is the requester RQ as another information processing apparatus according to the invention, the control unit 11 functions as referring means, selecting means, retrieving means, and scoring means according to the invention, and the communication unit 20 functions as connecting means according to the invention.

Next, the operations of each of the nodes N of the embodiment, which are the content holder CH, the root node RN, the cache node CN, and the requester RQ will be described.

(A) Operations in Content Holder

Figure 5:
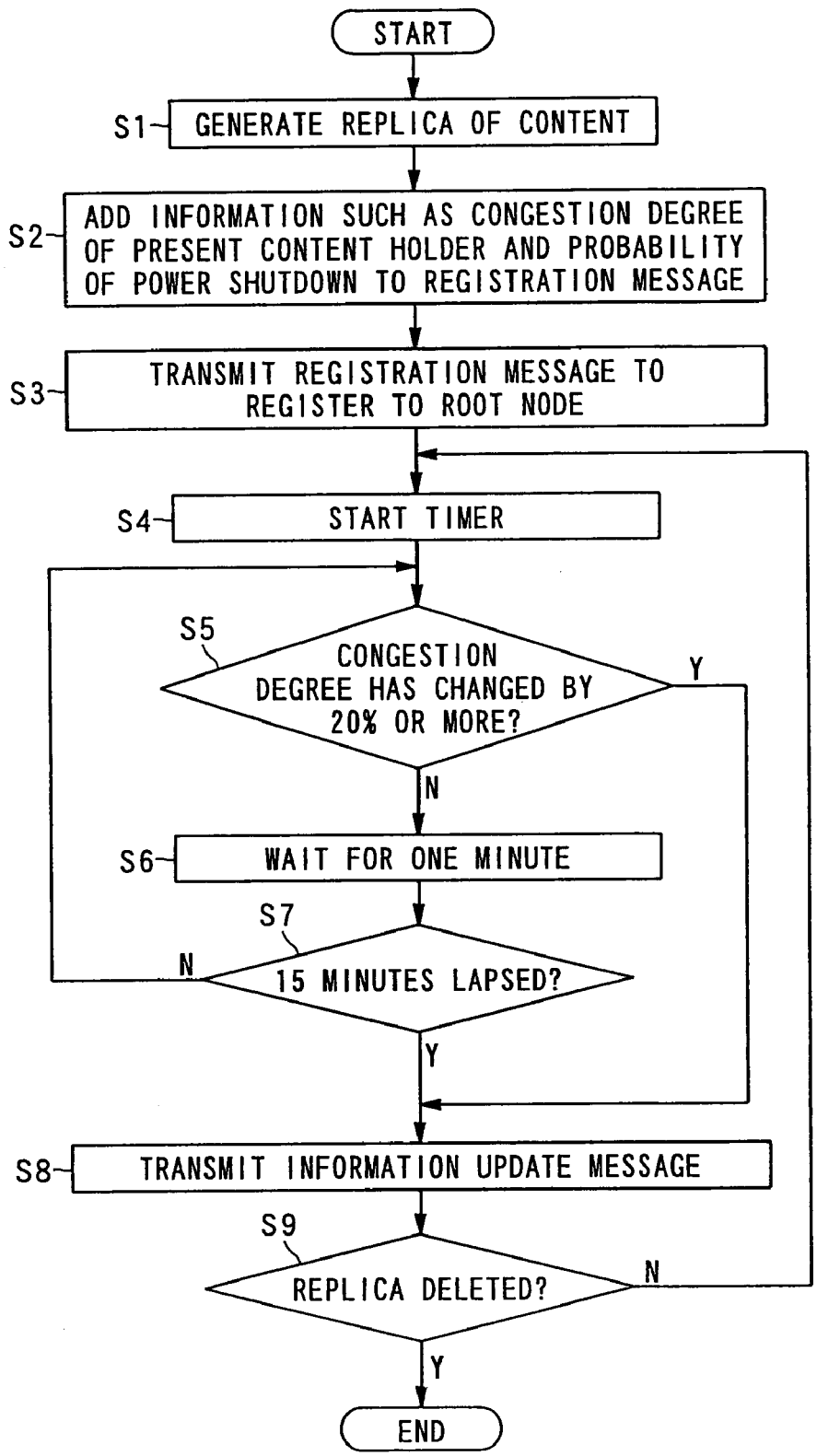
FIG. 5 is a flowchart showing an operation in the content holder according to the embodiment.

First, the operations in the content holder CH of the embodiment will be described with reference to FIG. 5 and FIGS. 6A to 6D. FIG. 5 is a flowchart showing the operations in the content holder CH in the embodiment. FIG. 6 is a diagram showing a concrete example of parameters constructing the distributability information HP according to the embodiment.

As shown in FIG. 5, in the content holder CH of the embodiment, first, when new content to be distributed (or replica of the content) is recorded in the recording unit 12 in the content holder CH (step S1), the distributability information HP at the point when the content is recorded in the recording unit 12 is generated (step S2), and the registration message Qp (see FIG. 3) having the index information EXX including the distributability information HP is transmitted to the node N as the root node RN (step S3).

The parameters (the range information 100, congestion degree information 101, line kind information 102, and frequency information 103 and 104, see FIG. 3) constructing the distributability information HP of the embodiment will be concretely described with reference to FIGS. 6A to 6D.

First, the range information 100 is an ISP (Internet Service Provider) to which the content holder CH belongs, in other words, an AS (Autonomous System) number indicating the range on the network, in which the content holder CH exists (the range on an actual physical network, not an area in the ID space shown in FIG. 1A or geometric area).

The line kind information 102 is, as shown in FIG. 6A, concretely, information of the kind of a line used to connect the content holder CH to a network in the distribution system. The line kind is an optical line, an ADSL (Asymmetric Digital Subscriber Line), or a CATV (Cable Television) line. As the score of the line kind information 102, the number of distribution content pieces which can be concurrently connected by the line can be used as it is. For example, the score of the line kind information 102 in the case where the line kind is an optical line is "15", the score of the line kind information 102 in the case where the line kind is an ADSL is "6", and the score of the line kind information 102 in the case where the line kind is a CATV line is "9".

The congestion degree information 101 is obtained as follows. A value derived by dividing the number of content pieces being concurrently distributed at present by the maximum number of content pieces which can be concurrently distributed in the line whose kind is indicated by the line kind information 102 is multiplied with "100". The resultant value is the congestion degree. Points which are assigned for ranges of the congestion degree are the congestion degree information 101. More concretely, when it is assumed that five content pieces are being actually concurrently distributed at present in the case where the line is the optical line (whose maximum number of content pieces which can be concurrently distributed is "15"), the congestion degree is calculated as follows.

5(the number of content pieces being presently distributed)/15(the maximum number of content pieces which can be concurrently distributed)× 100=33(%)

Points are assigned for ranges of the congestion degree, for example, as shown in FIG. 6B, thereby obtaining the congestion degree information 101. In the case shown in FIG. 6B, the lower the congestion degree is, the higher the score is for the reason that distribution of content is easier.

Further, the frequency information 103 will be described. In the distribution system using the DHT, content pieces are stored so as to be spread to the nodes N, and one or plural content pieces are recorded in the recording, unit 12 in each of almost all of the nodes N. There are cases such that a requester RQ accesses the content in the content holder CH as another node N and, for this access, power has to be supplied to the content holder CH. In other words, the larger the number of the content holders CH to which power is always supplied is, the quicker and stabler the content can be found from the requester RQ. However, the content holder CH is owned by another user, and the requester RQ (or the user who owns it) cannot control the power supply state of the content holder CH. Therefore, a score which is assigned according to the number of times power supply to the content holder CH was stopped, for example, in the past one month is added as the frequency information 103 corresponding to the content holder CH to the distributability information HP. More concretely, a score is assigned according to the number of times power supply was stopped in the past one month as shown in, for example, FIG. 6C, thereby obtaining the frequency information 103. In the case shown in FIG. 6C, the smaller the number of times the power supply was stopped is, the higher the score is for the reason that distribution of content is easier.

The frequency information 104 will now be described. Generally, the timeout is carried out as follows. In the case where it takes time, which is more than necessary, for a process of distributing content from the content holder CH for some reason (the reason may be on the content holder CH side or on the requester RQ side) and, even after lapse of predetermined time, the distributing process is not finished, the distributing process in the content holder CH is forcedly finished as the timeout. The timeout occurs in the case where content data cannot be downloaded even after lapse of the predetermined time in the requester RQ and also in the case where content data to be distributed is transmitted from the content holder CH to the requester RQ but there is no response from the requester RQ to the transmission. The number of timeouts can be a parameter indicative of distributability of content from the content holder CH. Therefore, a score assigned according to the number of timeouts which occur within, for example, past one month is included as the frequency information 104 in the distributability information HP. More concretely, scores are assigned according to the number of timeouts occurred in the content holder CH in the past one month as shown in FIG. 6D, thereby obtaining the frequency information 104. In the case shown in FIG. 6D, the smaller the number of timeouts is, it is regarded that distribution of content is easier and the higher score is set.

Finally, the score information 105 is obtained by summing up the scores of the range information 100, congestion degree information 101, line kind information 102, and frequency information 103 and 104. As the score information 105, a score obtained by simply adding up the scores of the range information 100 and the like may be used as the value of the score information 105, or a score obtained by placing preset weights on the parameters such as the range information 100, adding the resultant parameters, and normalizing the scores so that the maximum score of the score information 105 becomes, for example, 100 may be used. As an example of the weights, preferably, weight of 20/100 is placed on the range information 100, weight of 50/100 is placed on the congestion degree information 101, and weight of 10/100 is placed on each of the line kind information 102, the frequency information 103, and the frequency information 104.

When the registration message Qp including the index information EXX to which the distributability information HP including the parameters as shown in FIGS. 6A to 6D is added is transmitted toward the node N as the root node RN (step S3), counting of a not-shown timer in the control unit 11 of the content holder CH which has transmitted the registration message Qp is started (step S4).

While continuing the counting in the timer, whether any of the parameters constructing the distributability information HP in the content holder CH (for example, the congestion degree information 101 expected to have the highest possibility of change) is changed equal to or more than a preset threshold (±20% in the case of FIG. 5) is determined (step S5). When the parameter has changed (Y in step S5), it is considered that the distributability information HP corresponding to the content holder CH in the root node RN is to be updated, a message for the updating is transmitted to the root node RN (step S8). Next, a check is made to see whether the content (or its replica) recorded in the content holder CH has deleted from the recording unit 12 or not (step S9). When the content is deleted (Y in step S9), the process in the embodiment in the content holder CH is completed. On the other hand, when the content holder CH is not deleted yet (N in step S9), the program returns to the step S4 to start counting in a new timer after updating of the distributability information HP (step S8).

When it is determined in the step S5 that any of the parameters constructing the distributability information HP does not change more than the corresponding threshold (N in step S5), the content holder CH waits for another one minute (step S6) and determines whether 15 minutes has elapsed since the start of counting in the process in the immediately preceding step S4 (step S7).

When 15 minutes has elapsed (Y in step S7), irrespective of actual change in any of the parameters included in the distributability information HP, to address the possibility that the power of the root node is turned off and the root node is replaced with another node, the registration message Qp for updating is transmitted to the root node RN (step S8). After that, the program moves to the determination in the step S9. When 15 minutes has not elapsed yet since start of counting (N in step S7), to re-check the presence or absence of a change in any of the parameters included in the distributability information HP, the program returns to the step S5.

By the operation of the content holder CH described above, the distributability-information HP is newly generated and updated in association with initial registration of content, and the index information EXX including the distributability is recorded in the root node RN (and the cache node CN).

(B) Operation in Root Node and Cache Node Next, the operation in the root node RN and the cache node CN of the embodiment will be described with reference to FIG. 7 to FIGS. 9A to 9D. FIG. 7 is a flowchart showing general operation in the root node RN and the cache node CN in the embodiment. FIGS. 8A and 8B and FIGS. 9A to 9D are flowcharts showing detailed operations in the root node RN and the cache node CN.

As shown in FIG. 7, in the root node RN and the cache node CN of the embodiment, first, when any message (the registration message Qp or the distribution source query message Qr) is received from any of the nodes N in the distribution system (step S10), it is determined that the message is the registration message Qp from the content holder CH or the distribution source query message Qr from the requester RQ on the basis of the node ID of the transmission source or the like (step S11).

When the received message is the distribution source query message Qr from the requester RQ ("from requester" in step S11), next, a check is made to see that the node N itself which receives the distribution source query message Qr (that is, the node N in which the operations shown in the flowchart of FIG. 7 are executed) is the root node RN or the cache node CN (step S12).

When the node N is the root node RN ("root node" in step S12), a process of sending a reply of "the root node RN" to the distribution source query message Qr is performed (step S13), and the operations of the root node RN are finished. The details of the operations in the step S13 will be described later.

On the other hand, when it is determined in step S12 that the node N is the cache node CN ("cache node" in step S12), a process of sending a reply of "the cache node CN" to the distribution source query message Qr is performed (step S14), and the operations of the cache node CN are finished. The details of the operations in the step S14 will be also described later.

On the other hand, when it is determined in step S11 that the received message is the registration message Qp from the content holder CH ("from content holder" in step S11), next, in a manner similar to the determination in the step S12, the node N itself which receives the registration message Qp is the root node RN or the cache node CN (step S15).

Consequently, when the node N is the root node RN ("root node" in step S15), a check is made to see that the received registration message Qp is either the registration message Qp transmitted from the content holder CH at the time of newly registering content or the registration message Qp for updating the index information EXX corresponding to the registered content on the basis of the content or the like (step S16). When the received registration message Qp is the registration message Qp for new registration ("registration" in step S16), the node N as the root node RN performs registering process using the registration message Qp (step S17), and the operations of the root node RN are finished. The details of the operation in the step S17 will be described in detail later.

On the other hand, when it is determined in the step S16 that the received registration message Qp is the registration message Qp for updating ("update" in step S16), the node N as the root node RN performs the updating process using the registration message Qp (step S18), and the operations of the root node RN are finished. The details of the operation in the step S18 will be described later.

On the other hand, when it is determined in step S15 that the node N is the cache node CN ("cache node" in step S15), further, in a manner similar to the step S16, it is determined that the received registration message Qp is either the registration message Qp for new registration or the registration message Qp for updating the index information EXX on the basis of the content or the like of the received registration message Qp (step S19). When the received registration message Qp is the registration message Qp for new registration ("registration" in step S19), the node N as the cache node CN performs registering process using the registration message Qp (step S20), and the operations of the cache node CN are finished. The details of the operation in the step S20 will be also described in detail later.

On the other hand, when it is determined in step S19 that the received registration message Qp is the registration message Qp for updating ("update" in step S19), the node N as the cache node CN performs updating process using the registration message Qp (step S21), and the operations of the node N as the cache node CN are finished. The details of the operation in the step S21 will be described later.

Next, the details of the process for replying to the distribution source query message Qr in the cache node CN in the step S14 will be described with reference to FIG. 8A.

When the distribution source query message Qr is received in the cache node CN (see FIG. 3) that records the index information EXX similar to the root node RN, as shown in FIG. 8A, first, the index information EXX indicative of content desired by the requester RQ as the sender of the message and the number of pieces of the index information EXX is extracted (step S30). Whether the index information EXX having the same identification information as that for identifying the index information EXX extracted from the distribution source query message Qr is actually recorded in the cache node CN or not is determined (step S31). In the case where the index information EXX corresponding to the desired content is not recorded in the cache node CN (N in step S31), to retrieve the necessary index information EXX in another root node RN or cache node CN, the distribution source query message Qr is transferred to the another root node RN or cache node CN (step S36), and the processes of the node N as the cache node CN of the embodiment are finished.

On the other hand, in the case where it is determined in the step S31 that the index information EXX corresponding to the content desired in the distribution source query message Qr is found in the cache node CN (Y in step S31), next, range information indicative of the range on the network in which the requester RQ that has sent the distribution source query message Qr exists is compared with the range information 100 included in the found index information EXX (step S32). On the basis of the comparison result, the score of the range information 100 is determined depending on by whether the requester RQ and the content holder CH exist in the same ISP or not, and the score as the score information 105 including the score of the determined range information 100 is determined (step S33).

The value of the score information 105 determined for each of the index information EXX is compared with a threshold (included in the distribution query message Qr) as the score of the score information 105 to be included in the index information EXX desired by the requester RQ by the distribution source query message Qr, and it is determined whether or not desired number of pieces, which is indicated by the distribution source query message Qr, of the index information EXX including the score information 105 having the score equal to or larger than the threshold exist (step S34).

When the index information EXX of the desired number of pieces, including the score information 105 having the score equal to or larger than the threshold does not exist in the cache node CN (N in step S34), to retrieve the necessary index information EXX in another root node RN or cache node CN, the distribution source query message Qr is transferred to the another root node RN or cache node CN (step S36), and the processes of the node N as the cache node CN in the embodiment are finished.

On the other hand, when the desired number of pieces of the index information EXX including the score information 105 having the score equal to or larger than the threshold exist in the cache node CN (Y in step S34), the desired number of pieces of the index information EXX are sent to the requester RQ which has sent the distribution source query message Qr (step S35), and the processes of the node N as the cache node CN in the embodiment are finished.

Next, the details of the process of replying to the distribution source query message Qr in the root node RN in the step S13 will be described with reference to FIG. 8B.

In the case where the root node RN (see FIG. 3) that records the index information EXX similar to that of the cache node CN receives the distribution source query message Qr, as shown in FIG. 8B, first, processes similar to the steps S30 to S33 in FIG. 8A are performed on each of the index information EXX recorded in the root node RN. Finally, the score as the range information 100 in each of the index information EXX is determined, and the score as the score information 105 including the determined score of the range information 100 is determined for each of the index information EXX (step S33).

A determining process similar to that of the step S34 in FIG. 8A is performed on the index information EXX similarly recorded in the root node RN. When the desired number of pieces, indicated in the distribution source query message Qr, of the index information EXX including the score information 105 having the score equal to or larger than the threshold included in the distribution source query message Qr do not exist in the root node RN (N in step S34), a message indicating that the desired number of pieces of the index information EXX including the score information 105 having the value equal to or larger than the threshold requested in the distribution source query message Qr cannot be found so that the requester has to wait for a while is sent to the requester RQ which has sent the distribution source query message Qr (step S37). After that, the processes of the root node RN in the embodiment are finished.

On the other hand, when it is determined in step S34 that the desired number of pieces of the index information EXX including the score information 105 having the score equal to or larger than the threshold exist in the root node RN (Y in step S34), the desired number of pieces of the index information EXX are sent to the requester RQ which has sent the distribution source query message Qr (step S38), and the processes of the node N as the root node RN in the embodiment are finished.

Next, the details of the process of replying to the registration message Qp in the root node RN in the step S17 will be described with reference to FIG. 9A.

Figure 9A:
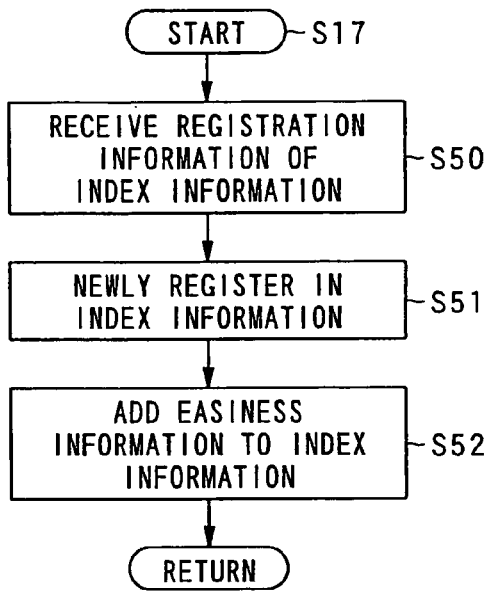
FIGS. 9A to 9D are flowcharts (II) showing a general operation in the root node and the cache node in the embodiment.

As shown in FIG. 9A, when the root node RN receives the registration message Qp for new registration (step S50), the index information EXX including the distributability information HP is recorded in the recording unit 12 (steps S51 and S52), and the processes of the node N as the root node RN in the embodiment are finished.

Next, the details of the process of replying to the registration message Qp in the root node RN in the step S18 will be described with reference to FIG. 9B.

Figure 9B:
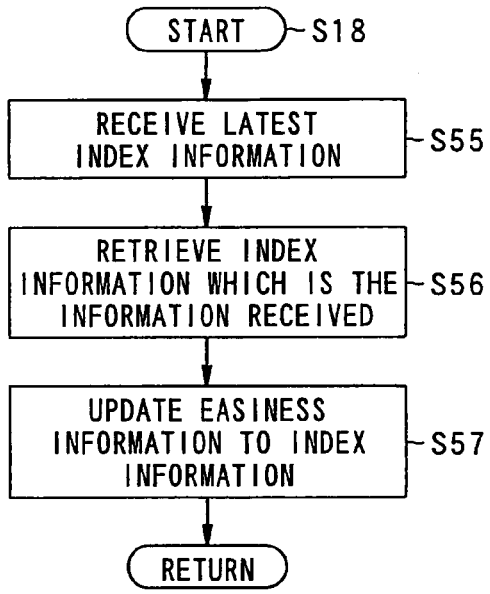

As shown in FIG. 9B, when the root node RN receives the registration message Qp for updating the distributability information HP (step S55), the existing index information EXX indicative of the same content as that of the index information EXX of the registration message Qp is retrieved in the root node RN (step S56). The retrieved index information EXX is rewritten with the new index information EXX (step S57), and the processes of the node N as the root node RN in the embodiment are finished.

Next, the details of the process of replying to the registration message Qp in the cache node CN in the step S20 will be described with reference to FIG. 9C.

Figure 9C:
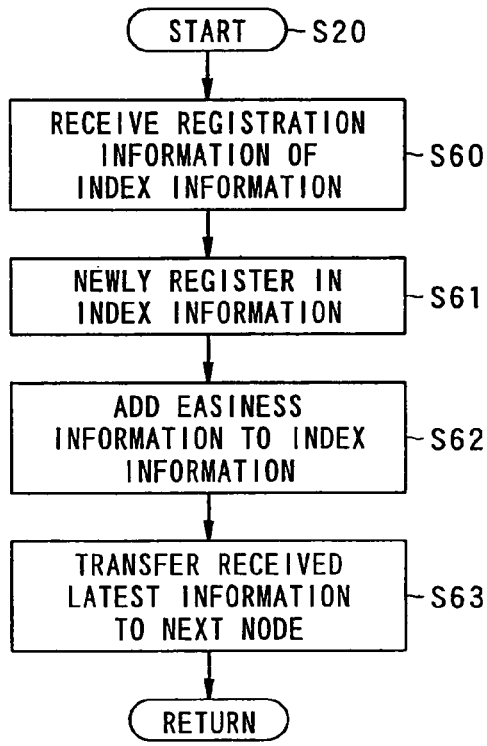

As shown in FIG. 9C, when the cache node CN receives the registration message Qp for new registration (step S60), the index information EXX including the distributability information HP is recorded in the recording unit 12 (steps S61 and S62), the registration message Qp for new registration is transferred to the next cache node CN (step S63), and the processes of the node N as the cache node CN in the embodiment are finished.

Finally, the details of the process of replying to the registration message Qp in the cache node CN in the step S21 will be described with reference to FIG. 9D.

Figure 9D:
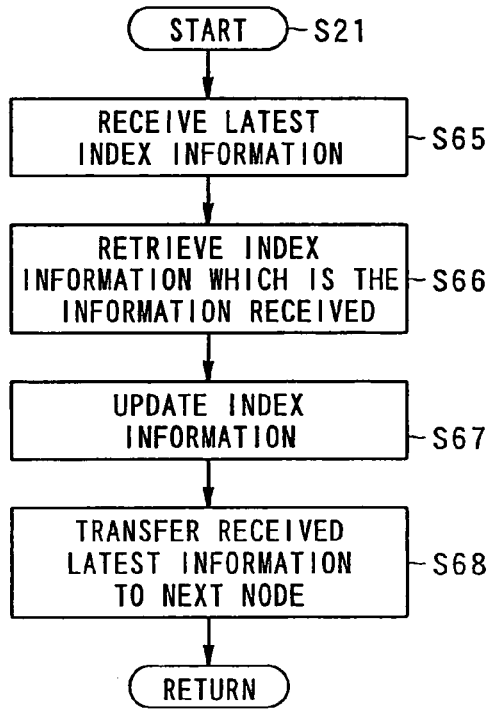

As shown in FIG. 9D, when the cache node CN receives the registration message Qp for updating the distributability information HP (step S65), the existing index information EXX indicative of the same content as that of the index information EXX of the registration message Qp is retrieved in the cache node CN (step S66). The retrieved index information EXX is rewritten with the new index information EXX (step S67), the registration message Qp for updating is transferred to the next cache node CN (step S68), and the processes of the node N as the cache node CN in the embodiment are finished.

(C) Operation in Requester

Finally, the operation in the requester RQ in the embodiment will be described with reference to FIG. 10. FIG. 10 is a flowchart showing the operations in the requester RQ in the embodiment.

As shown in FIG. 10, in the requester RQ in the embodiment, first, when an operation for requesting distribution of desired content by the user is executed in the input unit 21 in the requester RQ (step S70), the content ID indicative of the content requested to be distributed is calculated in the control unit 11 in the requester RQ (step S71). Further, the value of the threshold included in the distribution source query message Qr is concretely determined on the basis of the number of pieces of index information EXX requested to be referred to (the number of content holders CH as distribution sources of the content) (step S72).

The relation between the number of requests to refer to the index information EXX and the threshold will be concretely shown. For example, when there is only one reference request, to improve redundancy, the threshold is set to "90" since it is necessary to select the content holder CH which is easily distributed. When the number of reference requests is two or three, the distributability may be lower to some extent for one content holder CH, so that the threshold is set to "80". When the number of reference requests is four or five, the distributability for one content holder CH may be further lower, so that the threshold is set to "70". When the number of reference requests is six to nine, the distributability for one content holder CH may be further lower, so that the threshold is set to "60". Similarly, when the number of reference requests is ten or more, the threshold is set to "40" (step S72).

After the threshold as the distribution source query message Qr is determined, the distribution source query message Qr is transmitted toward the root node RN on the spanning tree in the network in the distribution system of the embodiment (step S73). A check is made to see whether the desired index information EXX as a result of the transmission is obtained or not (step S35 in FIG. 8A or FIG. S38 in FIG. 8B) or a message indicating that the requester RQ has to wait for a while is transmitted or not (step S37 in FIG. 8B) (step S74).

In the case where the desired number of pieces of the index information EXX having the value of the score information 105 higher than the threshold included in the distribution source query message Qr is obtained ("list" in step S74), the index information EXX having the highest value of the score information 105 is retrieved from the obtained index information EXX (step S77). The content holder CH indicated by the retrieved index information EXX is connected (step S78), and the desired content is distributed (step S79).

During the distribution, whether all of data of content to be distributed has been distributed or not is always monitored (step S80). When all of the data is distributed (Y in step S80), the processes of the requester RQ in the embodiment are completed.

On the other hand, when it is determined in step S80 that the desired content is being distributed (N in step S80), whether the interval of transmission of unit data of the content data (the transmission interval of the unit data is constant) is deviated from an interval which is determined in advance for the content by 10% or more is always monitored (step S81). While the deviation of the interval is maintained to be less than 10% (N in step S81), the program returns to the step S77 and the distribution is continued.

On the other hand, when the deviation of the distribution interval of the unit data is deviated from the reference by 10% or more (Y in step S81), it is determined that the operation of the content holder CHR itself as a distribution source is becoming unstable, and the content holder CH being presently connected is disconnected from the requester RQ side (step S82). Next, the index information EXX having the next highest score indicated by the score information 105 is retrieved from the index information EXX obtained (steps S73 and S74) (step S83). The requester RQ is connected to the content holder CH indicated by the index information EXX newly retrieved (step S84), and receives the desired content distributed (step S79).

On the other hand, in the case where a message indicating that the requester RQ has to wait for a while is sent in response to the distribution source query message Qr ("please wait for a while" in step S74), since there is the possibility that new index information EXX is obtained after lapse of some time, whether the distribution source query message Qr is transmitted again or not is determined (step S75). When it is determined to re-transmit the distribution source query message Qr (Y in step S75), the requester RQ waits for the lapse of the preset wait time (for example, 15 minutes) (step S76). The program returns to the step S73 and the distribution source query message Qr which is the same as that of last time is transmitted toward the root node Rn on the spanning tree of the embodiment (step S73). On the other hand, when it is determined in step S75 that the distribution source query message Qr is not automatically re-transmitted (that is, the message Qr is re-transmitted by operation of the user of the requester RQ) (N in step S75), the processes of the requester RQ in the embodiment are completed.

As described above, by the operations of the content holder CH, root node RN, cache node CN, and requester RQ as the nodes N in the embodiment, the index information EXX including the distributability information HP is recorded in the root node RN and the cache node CN so as to be referred to from the requester RQ via a network in the distribution system. Consequently, the content holder CH as the distribution source of the content can be selected on the basis of the distributability information HP in the requester RQ, and the content can be distributed efficiently and promptly.

Therefore, even in the case where the distributability of content varies among the content holders CH, the content holder CH which can distribute content easily can be selected by the requester RQ. Thus, content can be distributed promptly and efficiently.

When the distributability information HP in the content holder HP is updated, the index information EXX stored in the root node RN and the cache node CN is updated with the index information EXX including the updated distributability information HP. Consequently, the latest distributability information HP can be referred to from the requester RQ which receives the content distributed.

Further, the index information EXX itself including the distributability information HP is obtained by the requester RQ that receives the content distributed, and can be used for selecting the content holder CH as a distribution source.

Since the distributability information HP includes, as parameters, the range information 100, congestion degree information 101, line kind information 102, and frequency information 103 and 104, the requester RQ which receives the content distributed can select the content holder CH having the highest distributability accurately in correspondence with the actual distribution state.

Since the distributability information HP includes the score information 105 obtained by assigning scores to the range information 100, congestion degree information 101, line kind information 102, and frequency information 103 and 104, by referring to the score information 105, the requester RQ can determine the distributability in objective numerical values and select the content holder CH having the highest distributability.

Further, since the requester RQ selects the index information EXX by using the preset threshold as a reference, the content holder CH which can easily distribute content can be easily selected without accompanying a complicated determining process in the requester RQ which receives content distributed.

Further, since the threshold is changed according to the number of content holders desired to distribute content, for example, also in the case of distributing one piece of content from a plurality of content holders CH, the content holders CH which can easily distribute the content can be properly determined and the content can be received.

Since the distributability information HP is updated every preset time (in the embodiment, 15 minutes) in the content holder CH and distributability information HP newly generated every preset time is transmitted to the root node RN (and cache node CN), the latest distributability information HP of each of the content pieces can be referred to by the requester RQ.

Although the distributability information HP is updated every preset time, for example, every 15 minutes in the foregoing embodiment, the preset time is not limited to 15 minutes.

When the connection state between the requester RQ and the content holder CH to which the requester RQ is being presently connected and from which content is being distributed becomes unstable, the requester RQ is connected to another content holder CH indicated by the index information EXX including the second highest distributability and receives content distributed from the another content holder CH. Therefore, even if the network becomes partly unstable, the same content can be continuously distributed and received.

In the foregoing embodiment, the range information 100, congestion degree information 101, line kind information 102, and frequency information 103 and 104 have been mentioned as the parameters of the distributability information HP. When any one of the parameters is included in the distributability information HP, the effects of the present invention can be produced. The degree of importance of the parameters is, for example, preferably expressed as follows.

> Range information 100>congestion degree information 101>line kind information 102=frequency information 103 and 104.

In the foregoing embodiment, when the interval of receiving the unit data of the content data is deviated to some extent, it is determined that the connection to the content holder CH being connected became unstable, and the content holder CH from which content is distributed is switched. Alternately, when the connection is completely interrupted, the content holder CH may be similarly switched. In this case as well, even when the content holder CH being connected is disconnected, the same content can be continuously distributed.

Further, the content holder CH assigns scores to the congestion degree information 101, line kind information 102, and frequency information 103 and 104 out of the parameters constructing the distributability information HP. In any of the requester RQ, root node RN, and cache node CN, scores can be assigned to the distributability information HP. Although the root node RN or cache node CN assigns a score to the range information 100 out of the parameters of the distributability information HP, the requester RQ may assign a score.

In this case, if the entire distributability information HP is transmitted to the requester RQ, the data transmission/reception amount in the requester RQ becomes large. It is consequently possible to send only the score information 105 after the score assignment to the requester RQ.

In the foregoing embodiment, the distributability information HP is scored on the basis of the definition that the higher the score is, the higher the distributability is. On the contrary, scoring may be performed based on the definition that the lower the score is, the higher the distributability is. For the scoring, any scoring methods may be used as long as scores are defined uniformly in the distribution system.

Further, by recording a program corresponding to the flowcharts shown in FIGS. 5, 7, and 10 on an information recording medium such as a flexible disk or hard disk and reading and executing the program by a general computer, the computer can be made function as the control unit 11 in the embodiment.

As described above, the present invention can be used for the field of distribution of content via a network. Particularly, when the invention is applied to the field of distribution of content in a downloading manner, conspicuous effects are obtained.

The present invention is not confined to the configuration listed in the foregoing embodiments, but it is easily understood that the person skilled in the art can modify such configurations into various other modes, within the scope of the present invention described in the claims.

The invention claimed is:

1. An information processing apparatus in an information distribution system that includes a plurality of information processing apparatuses as a plurality of node apparatuses connected to each other through a network,
   wherein a plurality of distribution information to be distributed to the information processing apparatus is stored by a plurality of storing apparatuses out of the plurality of information processing apparatuses in a distributed manner, and the distribution information is transmitted or received among the information processing apparatuses,
   the information processing apparatus for managing location information of a storing apparatus, the location information indicating a location of the storing apparatus in the network, comprising:
   a first obtaining unit configured to obtain storing apparatus information including distribution information identification information for identifying the distribution information and the location information of the storing apparatus out of the plurality of information processing apparatuses;
   a second obtaining unit configured to obtain, from any of the plurality of node apparatuses, distributability information including easiness information indicative of easiness of distribution of the distribution information from the storing apparatus out of the plurality of information processing apparatuses and the location information of the storing apparatus that stores the distribution information including easiness of distribution indicated by the easiness information; and
   a recording unit configured to record the storing apparatus information obtained by the first obtaining unit and the distributability information obtained by the second obtaining unit, as index information that can be referred to from at least one of the plurality of the information processing apparatuses via the network,
   wherein the easiness information is information based on at least one of:
      an AS (Autonomous System) number indicative of a range on the network in which the storing apparatus exists,
      a kind of a network line to which the storing apparatus is connected,
      a first frequency as frequency of occurrence of interruption of power supply to the storing apparatus, and
      a second frequency as frequency of regarding that process of distributing the distribution information in the storing apparatus is stopped.

2. The information processing apparatus according to claim 1,
   further comprising an updating unit configured to update the distributability information recorded in the recording unit with the obtained distributability information in response to obtaining the updated distributability information.

3. The information processing apparatus according to claim 1,
   further comprising a transmitting unit configured to transmit the recorded distributability information to another information processing apparatus.

4. The information processing apparatus according to claim 1,
   wherein the easiness information is score information obtained by scoring at least one of values of the AS number, the kind of the network line, the first frequency, and the second frequency.

5. The information processing apparatus according to claim 1,
   further comprising a scoring unit configured to generate scored easiness information by scoring at least one of values of the AS number, the kind of the network line, the first frequency, and the second frequency constructing the easiness information included in the obtained distributability information, and recording the scored easiness information in place of the original easiness information in the recording unit.

6. The information processing apparatus according to claim 1,
   further comprising a retrieving unit configured to retrieve the distributability information including the easiness information indicating that distribution of the distribution information is easy with respect to a preset distributability criterion from a plurality of pieces of distributability information,
   wherein the recording unit is configured to record the distributability information retrieved by the retrieving unit so as to be referred to from another information processing apparatus.

7. The information processing apparatus according to claim 6,
   wherein the retrieving unit is configured to change the distributability criterion in accordance with the number of storing apparatuses for distributing the distribution information, and retrieve the distributability information by using the changed distributability criterion.

8. An information processing apparatus in an information distribution system that includes a plurality of information processing apparatuses as a plurality of node apparatuses connected to each other through a network,
  wherein a plurality of distribution information to be distributed to the information processing apparatus is stored by a plurality of storing apparatuses out of the plurality of information processing apparatuses in a distributed manner, and the distribution information is transmitted or received among the information processing apparatuses,
  the information processing apparatus comprising:
  a referring unit configured to refer to index information including distribution information identification information for identifying the distribution information, location information of a storing apparatus out of the plurality of information processing apparatuses, and easiness information indicative of easiness of distribution of the distribution information from the storing apparatus out of the plurality of information processing apparatuses, the location information indicating a location of the storing apparatus in the network;
  a selecting unit configured to select the storing apparatus to receive the distribution information on the basis of the index information referred to; and
  a connecting unit configured to connect to the selected storing apparatus via a network and receive the distribution information distributed;
  wherein the easiness information is information based on at least one of:
    an AS (Autonomous System) number indicative of a range on the network in which the storing apparatus exists,
    a kind of a network line to which the storing apparatus is connected,
    a first frequency as frequency of occurrence of interruption of power supply to the storing apparatus, and
    a second frequency as frequency of regarding that process of distributing the distribution information in the storing apparatus is stopped.

9. The information processing apparatus according to claim 8,
  wherein the easiness information is score information obtained by scoring at least one of values of the AS number, the kind of the network line, the first frequency, and the second frequency.

10. The information processing apparatus according to claim 8,
  further comprising a scoring unit configured to generate scored easiness information by scoring at least one of values of the AS number, the kind of the network line, the first frequency, and the second frequency constructing the easiness information included in the distributability information referred to,
  wherein the selecting unit is configured to select the storing apparatus to receive the distribution information on the basis of the easiness information scored by the scoring unit.

11. The information processing apparatus according to claim 8,
  further comprising a retrieving unit configured to retrieve the distributability information including the easiness information indicating that distribution of the distribution information is easy with respect to a preset distributability criterion from a plurality of pieces of distributability information,
  wherein the selecting unit is configured to select the storing apparatus to receive the distribution information on the basis of the distributability information retrieved by the retrieving unit.

12. The information processing apparatus according to claim 11,
  wherein the retrieving unit is configured to change the distributability criterion in accordance with the number of storing apparatuses for receiving the distribution information, and retrieve the distributability information by using the changed distributability criterion.

13. The information processing apparatus according to claim 8,
  wherein when a state of connection to the storing apparatus to which the distribution information is distributed becomes unstable, the selecting unit is configured to newly select the storing apparatus indicated by the location information included in the distributability information including the easiness information indicative of a second highest distributability expressed by the distributability information including the location information of the storing apparatus whose connection state becomes unstable with respect to the same distribution information among the distributability information referred to, and
  the connecting unit is connected to the newly selected storing apparatus via the network to receive the distribution information.

14. The information processing apparatus according to claim 8,
  wherein when the storing apparatus to which the distribution information is distributed is disconnected, the selecting unit is configured to newly select the storing apparatus indicated by the location information included in the distributability information including the easiness information indicative of a second highest distributability expressed by the distributability information including the location information of the storing apparatus which is disconnected with respect to the same distribution information among the distributability information referred to, and
  the connecting unit is connected to the newly selected storing apparatus via the network to receive the distribution information.

15. A storing apparatus in an information distribution system that includes a plurality of information processing apparatuses as a plurality of node apparatuses connected to each other through a network,
  wherein a plurality of distribution information to be distributed to the information processing apparatus is stored by a plurality of storing apparatuses out of the plurality of information processing apparatuses in a distributed manner, and the distribution information is transmitted or received among the information processing apparatuses,
  the storing apparatus comprising:
  a first generating unit configured to generate storing apparatus information including distribution information identification information identifying the distribution information and location information of a storing apparatus out of the plurality of information processing apparatuses, the location information indicating a location of the storing apparatus in the network;
  a second generating unit configured to generate, from any of the plurality of node apparatuses, distributability information including easiness information indicative of easiness of distribution of the distribution information from the storing apparatus out of the plurality of information processing apparatuses and the location information of the storing apparatus that stores the distribution information including easiness of distribution indicated by the easiness-information; and
a transmitting unit configured to transmit the storing apparatus information generated by the first generating unit and the distributability information generated by the second generating unit to the information processing apparatus for managing the location information of the storing apparatus;
wherein the easiness information is information based on at least one of:
an AS (Autonomous System) number indicative of a range on the network in which the storing apparatus exists,
a kind of a network line to which the storing apparatus is connected,
a first frequency as frequency of occurrence of interruption of power supply to the storing apparatus, and
a second frequency as frequency of regarding that process of distributing the distribution information in the storing apparatus is stopped.

16. The storing apparatus according to claim 15,
wherein when new distribution information is stored in the storing apparatus, the first generating unit and the second generating unit generate the storing apparatus information and the distributability information, respectively, and
when the new distribution information is stored in the storing apparatus, the transmitting unit is configured to transmit the generated storing apparatus information and the generated distributability information to the information processing apparatus.

17. The storing apparatus according to claim 15,
wherein the second generating unit is configured to generate the distributability information every preset time and,
when the distributability information is generated every preset time, the transmitting unit is configured to transmit the newly generated distributability information to the information processing apparatus.

18. The storing apparatus according to claim 15,
wherein when the easiness information changes, the second generating unit is configured to newly generate the corresponding distributability information and,
when the distributability information is newly generated, the transmitting unit is configured to transmit the generated distributability information to the information processing apparatus.

19. The storing apparatus according to claim 15,
further comprising a scoring unit configured to generate the easiness information by scoring at least one of values of the AS number, the kind of the network line, the first frequency, and the second frequency.

20. An information processing method for an information processing apparatus in an information distribution system that includes a plurality of information processing apparatuses as a plurality of node apparatuses connected to each other through a network, wherein a plurality of distribution information to be distributed to the information processing apparatus is stored by a plurality of storing apparatuses out of the plurality of information processing apparatuses in a distributed manner, and the distribution information is transmitted or received among the information processing apparatuses, the information processing apparatus managing location information of the storing apparatus, the location information indicating a location of the storing apparatus in the network, the information processing method comprising:
obtaining storing apparatus information including distribution information identification information for identifying the distribution information and the location information of a storing apparatus out of the plurality of information processing apparatuses;
obtaining, from any of the plurality of node apparatuses, distributability information including easiness information indicative of easiness of distribution of the distribution information from the storing apparatus out of the plurality of information processing apparatuses and the location information of the storing apparatus that stores the distribution information including easiness of distribution indicated by the easiness information; and
recording the obtained storing apparatus information and the obtained distributability information, as index information that can be referred to from at least one of the plurality of the information processing apparatuses via the network;
wherein the easiness information is information based on at least one of:
an AS (Autonomous System) number indicative of a range on the network in which the storing apparatus exists,
a kind of a network line to which the storing apparatus is connected,
a first frequency as frequency of occurrence of interruption of power supply to the storing apparatus, and
a second frequency as frequency of regarding that process of distributing the distribution information in the storing apparatus is stopped.

21. An information processing method for an information processing apparatus in an information distribution system that includes a plurality of information processing apparatuses as a plurality of node apparatuses connected to each other through a network, wherein a plurality of distribution information to be distributed to the information processing apparatus is stored by a plurality of storing apparatuses out of the plurality of information processing apparatuses in a distributed manner, and the distribution information is transmitted or received among the information processing apparatuses, the information processing method comprising:
referring to index information including distribution information identification information for identifying the distribution information, location information of a storing apparatus out of the plurality of information processing apparatuses, and easiness information indicative of easiness of distribution of the distribution information from the storing apparatus out of the plurality of information processing apparatuses, the location information indicating a location of the storing apparatus in the network;
selecting the storing apparatus to receive the distribution information on the basis of the index information referred to; and
connecting to the selected storing apparatus via a network and receiving the distribution information distributed:
wherein the easiness information is information based on at least one of:
an AS (Autonomous System) number indicative of a range on the network in which the storing apparatus exists,
a kind of a network line to which the storing apparatus is connected,
a first frequency as frequency of occurrence of interruption of power supply to the storing apparatus, and a second frequency as frequency of regarding that process of distributing the distribution information in the storing apparatus is stopped.

22. A storing method for storing apparatus information in an information distribution system that includes a plurality of information processing apparatuses as a plurality of node apparatuses connected to each other through a network, wherein a plurality of distribution information to be distributed to an information processing apparatus is stored by a plurality of storing apparatuses out of the plurality of information processing apparatuses in a distributed manner, and the distribution information is transmitted or received among the information processing apparatuses, the storing method comprising:

generating storing apparatus information including distribution information identification information identifying the distribution information and location information of a storing apparatus out of the plurality of information processing apparatuses, the location information indicating a location of the storing apparatus in the network;

generating, from any of the plurality of node apparatuses, distributability information including easiness information indicative of easiness of distribution of the distribution information from the storing apparatus out of the plurality of information processing apparatuses and the location information of the storing apparatus that stores the distribution information including easiness of distribution indicated by the easiness information; and transmitting the generated storing apparatus information and distributability information to the information processing apparatus for managing the location information of the storing apparatus;

wherein the easiness information is information based on at least one of:
an AS (Autonomous System) number indicative of a range on the network in which the storing apparatus exists,
a kind of a network line to which the storing apparatus is connected,
a first frequency as frequency of occurrence of interruption of power supply to the storing apparatus, and
a second frequency as frequency of regarding that process of distributing the distribution information in the storing apparatus is stopped.

23. A non-transitory computer readable recording medium in which an information processing program for making a computer function as an information processing apparatus is recorded so as to be able to be read by the computer, the information processing apparatus being in an information distribution system that includes a plurality of information processing apparatuses as a plurality of node apparatuses connected to each other through a network, wherein a plurality of distribution information to be distributed to the information processing apparatus is stored by a plurality of storing apparatuses out of the plurality of information processing apparatuses in a distributed manner, and the distribution information is transmitted or received among the information processing apparatuses, the information processing apparatus managing location information of the storing apparatus, the location information indicating a location of the storing apparatus in the network, the program comprising:

instructions for obtaining storing apparatus information including distribution information identification information for identifying the distribution information and the location information of a storing apparatus out of the plurality of information processing apparatuses;

instructions for obtaining, from any of the plurality of node apparatuses, distributability information including easiness information indicative of easiness of distribution of the distribution information from the storing apparatus out of the plurality of information processing apparatuses and the location information of the storing apparatus that stores the distribution information including easiness of distribution indicated by the easiness information; and instructions for recording the storing apparatus information and the distributability information, as index information that can be referred to from at least one of the plurality of the information processing apparatuses via the network;

wherein the easiness information is information based on at least one of:
an AS (Autonomous System) number indicative of a range on the network in which the storing apparatus exists,
a kind of a network line to which the storing apparatus is connected,
a first frequency as frequency of occurrence of interruption of power supply to the storing apparatus, and
a second frequency as frequency of regarding that process of distributing the distribution information in the storing apparatus is stopped.

24. A non-transitory computer readable recording medium in which an information processing program for making a computer function as an information processing apparatus is recorded so as to be able to be read by the computer, the information processing apparatus being in an information distribution system that includes a plurality of information processing apparatuses as a plurality of node apparatuses connected to each other through a network, wherein a plurality of distribution information to be distributed to the information processing apparatus is stored by a plurality of storing apparatuses out of the plurality of information processing apparatuses in a distributed manner, and the distribution information is transmitted or received among the information processing apparatuses, the program comprising:

instructions for referring to index information including distribution information identification information for identifying the distribution information, location information of a storing apparatus out of the plurality of information processing apparatuses, and easiness information indicative of easiness of distribution of the distribution information from the storing apparatus out of the plurality of information processing apparatuses, the location information indicating a location of the storing apparatus in the network;

instructions for selecting the storing apparatus to receive the distribution information on the basis of the index information referred to; and instructions for connecting to the selected storing apparatus via a network and receive the distribution information distributed:

wherein the easiness information is information based on at least one of:
an AS (Autonomous System) number indicative of a range on the network in which the storing apparatus exists,
a kind of a network line to which the storing apparatus is connected,
a first frequency as frequency of occurrence of interruption of power supply to the storing apparatus, and a second frequency as frequency of regarding that process of distributing the distribution information in the storing apparatus is stopped.

25. A non-transitory computer readable recording medium in which a storing program for making a computer function as a storing apparatus is recorded so as to be able to be read by the computer, the storing apparatus being in an information distribution system that includes a plurality of information processing apparatuses as a plurality of node apparatuses connected to each other through a network, wherein a plurality of distribution information to be distributed to the information processing apparatus is stored by a plurality of storing apparatuses out of the plurality of information processing apparatuses in a distributed manner, and the distribution information is transmitted or received among the information processing apparatuses, the program comprising:

instructions for generating storing apparatus information including distribution information identification information identifying the distribution information and location information of a storing apparatus out of the plurality of information processing apparatuses, the location information indicating a location of the storing apparatus in the network;

instructions for generating, from any of the plurality of node apparatuses, distributability information including easiness information indicative of easiness of distribution of the distribution information from the storing apparatus out of the plurality of information processing apparatuses and the location information of the storing apparatus that stores the distribution information including easiness of distribution indicated by the easiness information; and instructions for transmitting the storing apparatus information and distributability information to the information processing apparatus for managing the location information of the storing apparatus;

wherein the easiness information is information based on at least one of:

an AS (Autonomous System) number indicative of a range on the network in which the storing apparatus exists, a kind of a network line to which the storing apparatus is connected, a first frequency as frequency of occurrence of interruption of power supply to the storing apparatus, and a second frequency as frequency of regarding that process of distributing the distribution information in the storing apparatus is stopped.

26. The information processing apparatus according to claim 1, wherein the recording unit is configured to record the storing apparatus information obtained by the first obtaining unit, and the second obtaining unit is configured to obtain the easiness information corresponding to the location information recorded in the recording unit, as the distributability information.

27. The information processing apparatus according to claim 1, wherein the distribution information is transmitted or received among the information processing apparatuses using a routing table which registers location information of at least one of the plurality of the information processing apparatuses.

28. The information processing apparatus according to claim 8, wherein the distribution information is transmitted or received among the information processing apparatuses using a routing table which registers location information of at least one of the plurality of the information processing apparatuses.

29. The storing apparatus according to claim 15, wherein the distribution information is transmitted or received among the information processing apparatuses using a routing table which registers location information of at least one of the plurality of the information processing apparatuses.

* * * * *